United States Patent Office 3,444,740
Patented May 20, 1969

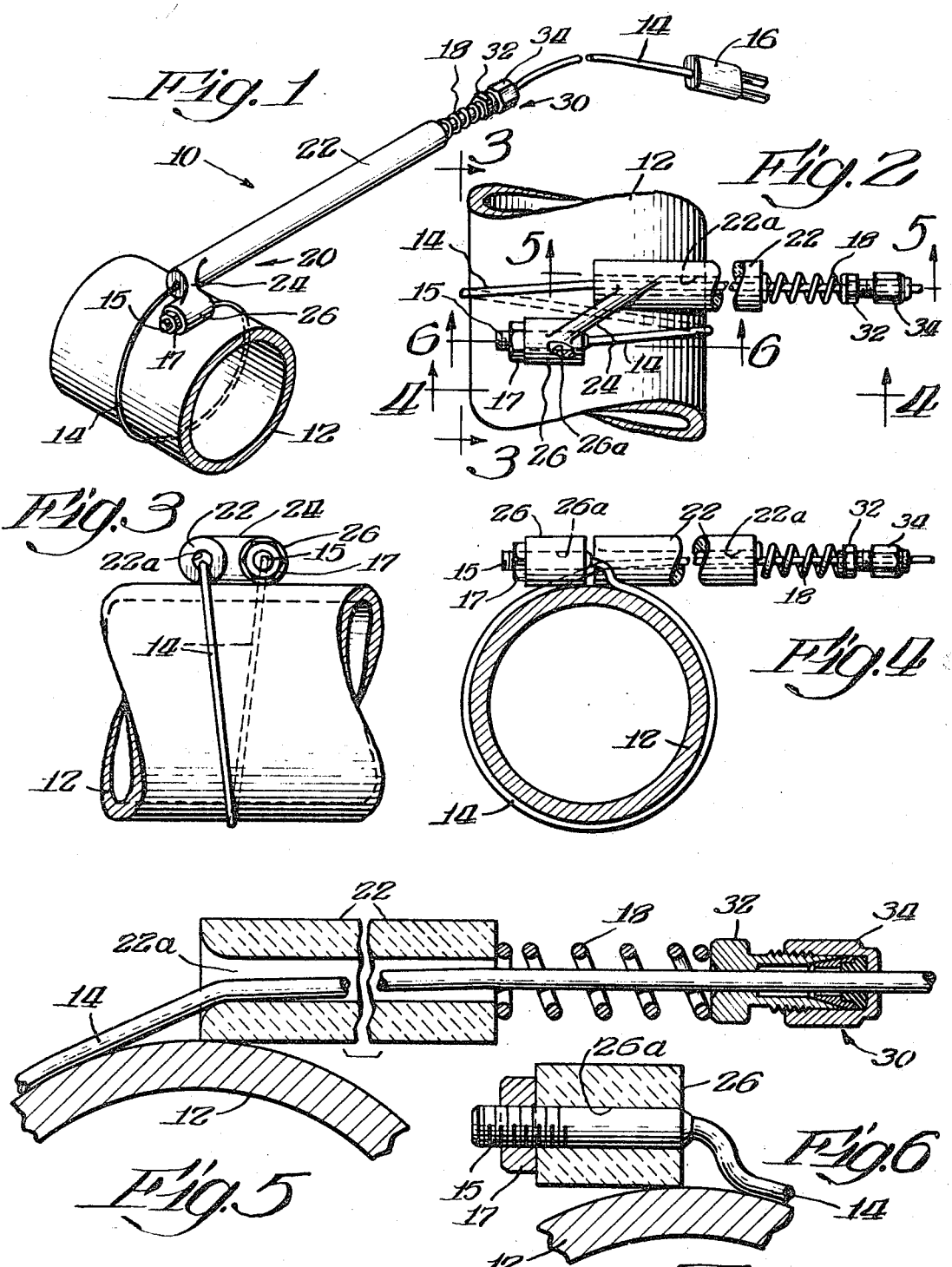

3,444,740
APPARATUS AND METHOD FOR
MEASURING TEMPERATURE
Bayard C. Davis, 425 S. Grace, Lombard, Ill. 60148
Filed Apr. 18, 1967, Ser. No. 631,633
Int. Cl. G01k 5/18
U.S. Cl. 73—359                                         4 Claims

ABSTRACT OF THE DISCLOSURE

A thermoelectric transducer for measuring the greatest temperature along a line on a surface, such as the circumference of a pipe or tank. The thermoelectric transducer, comprising a pair of conductors surrounded by a mass of semiconductive material, a layer of metallic oxide insulating material and an outer metallic sheath, is wrapped about the tank or pipe and is maintained in intimate contact therewith by a spring-loaded holding device. The thermoelectric voltage measured at the cold junction of the transducer corresponds to the greatest temperature in the circumferential surface segment of the pipe or tank about which the transducer is wrapped.

---

This invention relates to a method and apparatus for making temperature measurements and, more particularly, to a method and apparatus for measuring the greatest temperature within a circumferential segment of a curved surface. Specifically, the invention enables a true measurement of the temperature at a given position along, for example, a cylindrical surface (e.g., a pipe or tube), by measuring the greatest temperature around the circumference of the cylindrical surface at that position.

Accordingly, it is an object of this invention to provide a method and apparatus for measuring the greatest temperature along a line on a surface.

It is a further object of this invention to provide a method and apparatus which will enable measurement of the greatest temperature around the circumference of a cylindrical surface at a given position on that surface.

It is an additional object of this invention to provide a method and apparatus which will result in a true measurement of the temperature of material within a pipe line or tube at a given position along the length of the pipe line or tube.

A fuller understanding and appreciation of the foregoing objects, as well as others, will be gained from a consideration of the following specification and claims, with illustrative reference to the drawings, in which:

FIGURE 1 is a perspective view of a transducer assembly designed for carrying out the present invention.

FIGURE 2 is a top view of the transducer assembly depicted in FIGURE 1.

FIGURE 3 is an end view, taken along the lines 3—3 of FIGURE 2.

FIGURE 4 is a sectional view, taken along the lines 4—4 of FIGURE 2.

FIGURE 5 is a sectional view, partially fragmented, taken along the lines 5—5 of FIGURE 2.

FIGURE 6 is a sectional view, partially fragmented, taken along the lines 6—6 of FIGURE 2.

In general, the present invention is directed to a method for determining the greatest temperature along a line on a surface. The invention has a particularly advantageous application in connection with temperature measurements along pipes or tubes, and the specific embodiment described herein will be discussed in that connection. It should be clear, however, that the invention has a much broader scope of utility, and indeed can be used to great advantage wherever it becomes necessary to establish the highest temperature along a given line on a surface.

It is often necessary to establish the temperature at a given position along a pipe or tube, as for example, in the case of chemical processing equipment, or boiler tubes. However, merely determining the temperature at one point around the circumference of the pipe or tube will not always result in a true measurement of pipe temperature at that position. It often happens that scale or other deposits which have accumulated at points around the circumference of the inner pipe walls will serve as insulation and thus result in an incorrect reading. The present invention overcomes this problem by providing a method whereby the greatest temperature around the entire circumference of the pipe at the desired position along the pipe can be measured.

Basically, the invention contemplates a method wherein a thermoelectric transducer contacts the pipe surface along the entire line of interest. The thermoelectric transducer is preferably of the type described and claimed in U.S. Patent No. 3,408,607 issued Oct. 29, 1968, wherein a pair of helically-wrapped conductors is surrounded by a densely compacted mass of semi-conductive material. The semi-conductive material is in turn surrounded by a layer of metallic oxide insulating material, and the whole structure is contained within a tubular metallic sheath. The semi-conductive material has an inverse temperature-resistance characteristic and the conductors are formed of dissimilar materials capable of establishing thermoelectric junctions across the semi-conductive material. Thus, in accordance with the well known Seebeck effect, when a portion of the transducer is maintained as a "cold" junction, thermoelectric voltages are generated in accordance with temperature conditions at hotter areas of the transducer. Since the semi-conductive material will present the lowest resistance path at the point of greatest temperature, the thermoelectric voltage measured at the "cold" junction will correspond to the highest temperature along the entire length of the transducer. Accordingly, if the transducer is maintained in intimate contact around the circumference of a pipe at the position of interest along the length of the pipe, the true prevailing temperature at that position can be determined.

It should be recognized, of course, that this method would be equally suitable for measuring the greatest temperature prevailing along a given length of pipe. In such circumstance, the transducer would simply be positioned in intimate contact with the pipe surface in a direction parallel to the pipe. Alternatively, the transducer might be helically wrapped about the pipe. Similar arrangements can be used with other surface configurations as well.

With specific reference to the drawings, there is shown in FIGURE 1 a transducer assembly 10 which is particularly suitable for measuring the greatest temperature around the circumference of a pipe 12 at a desired location along the pipe. As best seen in FIGURES 1 through 4, a thermoelectric transducer 14, of the type described above, is wrapped about the circumference of the pipe 12 and is maintained in intimate contact therewith by the coaction of a tension member 20, a compression fitting 30 and a compression spring 18. A connector 16 is provided at one end of the transducer 14 to enable contact with external measuring instrumentalities (not shown).

The tension member 20 includes a long leg 22 and a short leg 26 disposed in parallel relationship and connected by a connecting arm 24. As best seen in FIGURES 5 and 6, the long leg 22 and the short leg 26 are respectively provided with axial bores 22a and 26a. FIGURE 5 also illustrates the basic component parts of the compression fitting 30 which comprises a bolt 32 and a threaded cap 34. The compression fitting 30 is a conventional swage-type device adapted to clamp securely about the transducer 14 when the cap 34 is tightened onto the bolt 32.

As indicated above, one end of the transducer 14 is provided with a connector 16. At the other end of the transducer 14, as shown in FIGURE 6, is a threaded tension fitting 15 and a nut 17.

The internal dimensions of the compression spring 18, the compression fitting 30, and the axial bore 22a of the long leg 22 are such that those components can be easily moved along the length of the transducer 14. Typically, it is contemplated that the threaded tension fitting 15 will not have been inserted into the axial bore 26a of the short leg 26 prior to positioning of the transducer assembly 10 for taking temperature measurements.

The transducer assembly 10 is positioned as follows. The transducer 14 is wrapped or formed around the circumference of the pipe 12 at the desired position. The threaded tension fitting 15 on the end of the transducer 14 is then inserted through the axial bore 26a of the short leg 26 and secured by the nut 17. The tension member 20 is then held securely while the transducer 14 is pulled to insure intimate contact of the transducer with the pipe surface. When the desired degree of wrapping tightness of the transducer 14 is achieved, the compression spring 18 is slid adjacent the tension member 20 and the compression fitting 30 is pushed against the compression spring until the desired spring loading is achieved. The compression fitting 30 is then secured to the transducer 14 by tightening the cap 34 onto the bolt 32.

In such manner, the transducer 14 is firmly held about the pipe 12 and is under a continuous resilient tension force equal to the compression loading of the spring 18. The tension asserted by the spring 18 insures positive circumferential contact of the transducer 14 with the pipe 12 at all times, even during heating and cooling cycles wherein thermal expansion and contraction might ordinarily cause loosening.

The foregoing structure is of course only exemplary, and numerous modifications may be made without departing from the spirit of the invention. For example, while the circumferential contact of the transducer 14 with the pipe 12, as shown in the drawing, is substantially 360°, this can be varied over any desired range simply by modifying the configuration of the tension member 20 and/or by effecting multiple wraps of the transducer 14 about the pipe 12. In addition, by modifying the tension member 20, the line of contact of the transducer 14 and the pipe 12 can be made to approximate more closely a closed curve, as for example, by reducing the lateral distance between the axial bores 22a and 26a.

In order to describe the invention with the requisite particularity, it has been necessary to describe many structural features in great detail. Keeping in mind the requirement that the transducer must be maintained in intimate contact with the line of interest on the surface whose temperature is to be measured, numerous modifications in such detail and in the combination and arrangement of components will be apparent to those familiar with the art.

I claim:
1. Apparatus for sensing the greatest temperature along a given circumferential line about a closed curved surface, including: a thermoelectric transducer comprising a tubular sheath, a mass of semiconductive material having an inverse temperature-resistance characteristic within said sheath, and a pair of conductors surrounded and spaced by said material, said conductors being formed of dissimilar materials capable of establishing a thermoelectric junction across said material; and means for maintaining said transducer in contact with said surface along said line comprising a member having a pair of apertures therethrough, one of said apertures defining a passage for an end of said transducer and the other of said apertures defining a passage for a returning circumferential loop of said transducer; first stop means associated with said end of said transducer for preventing the withdrawal thereof from said one aperture; and second stop means associated with said returning loop of said transducer for preventing the withdrawal thereof from said other aperture.

2. Apparatus as defined in claim 1, including resilient means disposed between said second stop means and said member so as to exert a resilient tensing force on said transducer.

3. Apparatus as defined in claim 2, wherein said resilient means is a compression spring disposed concentric to said transducer.

4. In combination: a thermoelectric transducer adapted to be wrapped circumferentially about the outer surface of a pipe; a member having a pair of apertures therethrough, one of said apertures defining a passage for an end of said transducer and the other of said apertures defining a passage for a returning circumferential loop of said transducer from about said pipe; first stop means associated with said end of said transducer for preventing the withdrawal thereof from said one aperture; second stop means associated with said returning loop of said transducer to prevent the withdrawal thereof from said other aperture, means associated with at least one of said first and second stop means and with said member so as to exert a resilient tensing force on said transducer; and means for measuring a thermoelectric voltage generated by said transducer.

References Cited

UNITED STATES PATENTS

| 2,376,920 | 5/1945 | Jones | 340—228 |
| 2,586,252 | 2/1952 | Peters. | |
| 2,805,272 | 9/1957 | Postal | 136—228 |
| 2,941,192 | 6/1960 | Postal. | |
| 3,022,478 | 2/1962 | Fish. | |
| 3,307,401 | 3/1967 | Bachman | 73—359 |

LOUIS R. PRINCE, Primary Examiner.

F. SHOON, Assistant Examiner.

U.S. Cl. X.R.

73—341, 351; 136—228, 230